United States Patent [19]

Terada et al.

[11] Patent Number: 4,660,886
[45] Date of Patent: Apr. 28, 1987

[54] RECLINING SEAT MECHANISM

[75] Inventors: Takami Terada, Toyota; Saburo Suzuki, Tokoname, both of Japan

[73] Assignee: Aisin Seiki Kabushiki Kaisha, Japan

[21] Appl. No.: 745,221

[22] Filed: Jun. 17, 1985

[30] Foreign Application Priority Data

Jun. 18, 1984 [JP] Japan .................................. 59-124677

[51] Int. Cl.⁴ .............................................. B60N 1/02
[52] U.S. Cl. .................................. 297/367; 297/364; 297/379
[58] Field of Search ............................... 297/363–369, 297/354, 355, 379

[56] References Cited

U.S. PATENT DOCUMENTS 3,953,069 4/1976 Tamura et al. ....................... 297/367
4,502,730 3/1985 Kazaoka et al. ..................... 297/366

FOREIGN PATENT DOCUMENTS 1555301 7/1970 Fed. Rep. of Germany ...... 297/367
3419061 1/1985 Fed. Rep. of Germany ...... 297/366
1296060 5/1962 France ................................ 297/367
55-47406 11/1980 Japan .

Primary Examiner—Kenneth J. Dorner
Assistant Examiner—Mark W. Binder
Attorney, Agent, or Firm—Finnegan, Henderson, Farabow, Garrett & Dunner

[57] ABSTRACT

A reclining seat mechanism including a seat bracket carrying a seat cushion and a seat back plate mounted on the seat bracket for swinging movement about a shaft and carrying a seat back. A tilting angle adjusting mechanism is provided for adjusting the tilting angle of the seat back. The adjusting mechanism is provided with a tilting angle memorizing mechanism for mechanically memorizing the tilting angle of the seat back so that the memorized position can be restored when the seat back is once folded forward and returned to the tilted position. The memorizing mechanism can be actuated by the same actuating lever as the tilting angle adjusting mechanism.

5 Claims, 5 Drawing Figures

RECLINING SEAT MECHANISM

BACKGROUND OF THE INVENTION

1. Field of the Invention

The present invention relates to a tilting mechanism applicable, for example, to a reclining vehicle seat and a tiltable vehicle steering shaft. More specifically, the present invention pertains to a tilting mechanism having a tilt angle memorizing device.

2. Description of Prior Art

Conventionally, in a vehicle reclining seat, there is provided a movable bracket secured to a seat back and mounted for pivotable movement about a shaft on a stationary bracket secured to a seat bottom frame. Usually, the movable bracket is provided with a sector member having gear teeth formed along its arcuate periphery. A pawl member is swingably mounted on the stationary bracket and has pawls or gear teeth which are adapted to be brought into engagement with the gear teeth on the sector member. An actuating lever is provided for rotational movement about the shaft on which the movable bracket is mounted. The actuating lever is interconnected with the pawl member through a cam mechanism so that a rotational movement of the lever causes a swinging movement of the pawl member to move the pawls thereon into or out of engagement with the gear teeth on the sector gear member. The actuating lever is spring biased so that it normally forces the pawl member into a position wherein the pawl teeth are engaged with the gear teeth on the sector. An actuation of the lever against the spring biasing force causes a swinging movement of the pawl member so that the pawl teeth are disengaged from the gear teeth on the sector to release the movable bracket and the seat back for tilting movement about the shaft. The movable bracket is provided with a return spring which functions to normally maintain the seat back in an upright position. The seat back can be moved into a tilted position against the action of the return spring while the actuating lever is in the actuated position. When the actuating lever is released with the seat back tilted into a desired position, the pawl member is forced by the actuating lever into the position where the pawl teeth are engaged with the gear teeth on the sector.

The conventional reclining vehicle set is also structured so that the seat back can be folded forward. This structure is convenient particularly for use in two-door cars having front and rear seats because an adequate opening can be provided by folding the seat back forward to allow a passenger to get in and out of the rear seat. It has been found that this type of reclining seat is inconvenient in that, once the seat back is folded forward from a tilted position and it is returned to the upright position it is not returned to the original tilted position so that a tilting adjustment becomes necessary after the seat back is returned to the upright position.

In order to solve the problem, Japanese utility model publication No. 55-47406 proposes a seat back tilting mechanism having a tilt angle memory device. In the proposed structure, the actuating lever for the seat back tilting mechanism is provided with a push button which is connected with the tilt angle memory device so that the memory device is actuated to memorize the seat back tilt angle when the push button is depressed. It should however be noted that the proposed structure is inconvenient for use because the push button must be depressed independently from the actuation of the lever in order to have the tilt angle memorized.

SUMMARY OF THE INVENTION

It is therefore an object of the present invention to provide a tilting mechanism having a tilt angle memory device which automatically memorizes the tilt angle when the tilt mechanism is moved to a folded position.

Another object of the present invention is to provide a tilting mechanism in which the original tilt position can automatically be restored when the mechanism is moved from the tilt position into a folded position and returned from the folded position.

To achieve the objects and in accordance with the purpose of the present invention, as embodied and broadly described herein, tilting mechanism of this invention includes a stationary member, a movable member mounted on said stationary member for swinging movement about a first axis on said stationary member, a first series of teeth provided on said movable member, a second series of teeth provided on said movable member and arranged in parallel with said first series of teeth, a swingable member mounted on said stationary member for swinging movement about a second axis on said stationary member and having at least one pawl which is adapted to be engaged with the first series of teeth on the movable member, and actuating lever mounted on said stationary member for rotational movement about said first axis, said actuating lever having means for moving upon rotational movements of the lever said swinging member into and out of an engaged position wherein said pawl is engaged with said first series of teeth on said movable member, a slidable member having at least on pawl normally disengaged from said second series of teeth on said movable member, resilient means for yieldably forcing said slidable member to a position where said pawl on the slidable member is disengaged from the second series of teeth, memory means responsive to movement of the actuating lever for moving the slidable member against said resilient means to that the pawl on the slidable member becomes engaged with the second series of teeth when the actuating lever forces the swingable member out of said engaged position, a locking member mounted on said stationary member for swinging movement about said first axis, said locking member movable between a first position it is engaged with said swinging member to hold the swinging member out of said engaged position and a second position where it is disengaged from said swinging member, said slidable member engageable with said locking member to force the locking member into said second position when said movable member is returned to an original tilted position after it has been moved from the original tilted position to another position so as to disengage the locking member from the swinging member to make the swinging member free to have its pawl engage the firsft series of teeth, and means for normally maintaining the slidable member in a position wherein said pawl on the slidable member is engageable with a portion of the second series of teeth corresponding to an actual tilted position of the movable member.

The tilting mechanism of the present invention can most suitably be applied to a reclining vehicle seat, however, it can also be applied to another structure such as a tiltable vehicle steering shaft. Where the tilting mechanism is applied to a reclining vehicle seat having a forwardly folded position as well as tilted positions, the aforementioned another position may be the forwardly folded position and there may be provided driving means responsive to a movement of the movable member into the forwardly folded position for driving the locking member into said first position.

The above and other objects and features of the present invention will become apparent from the following description of a preferred embodiment in which the present invention is applied to a reclining vehicle seat structure as shown in the accompanying drawings.

DESCRIPTION OF THE PREFERRED EMBODIMENT

Figure 1:
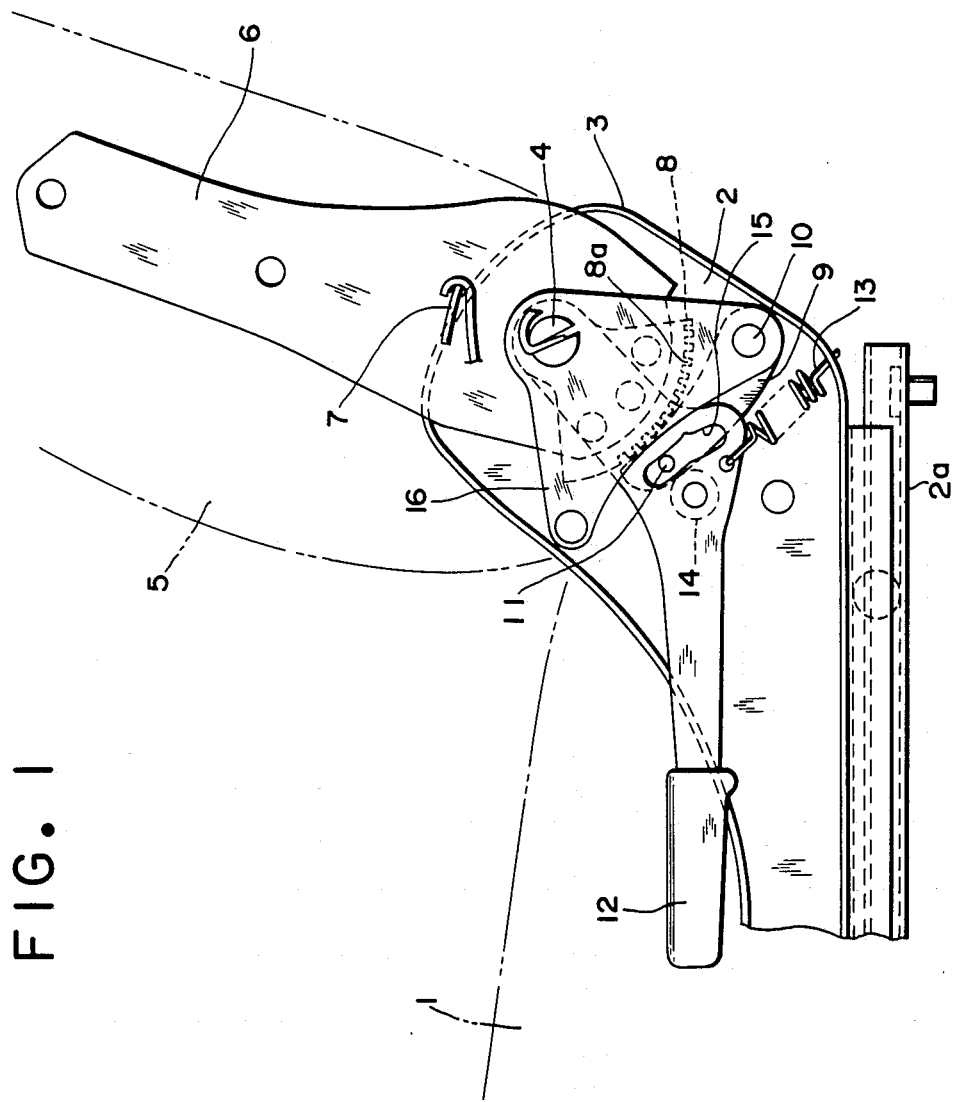
FIG. 1 is a fragmentary sectional view of a reclining vehicle seat structure applicable to one embodiment of the present invention.

Referring to the drawings, particularly to FIG. 1, there is shown a vehicle receiving seat structure to which the present invention is applicable including a seat cushion 1 attached to a seat cushion bracket 2 which is mounted on a rail structure 2a. The bracket 2 constitutes the stationary member of this invention and is provided at its rear end portion with a raised portion 3. A transversely extending shaft 4 is mounted on the raised portion 3 of the bracket 2 and a seat back plate 6 is swingably mounted on the shaft 4. The seat back plate 6 is secured to one side of a seat back frame which carries a seat back 5. Although not shown in the drawings, an identical structure is provided at the other side of the seat so that the seat back frame is supported at the opposite sides thereof.

Between the seat cushion bracket 2 and the seat back plate 6, there is provided a return spring 7 for maintaining the plate 6 and therefore the seat back 5 normally in an upright position as shown in FIG. 1. The seat back plate 6 has a sector plate 8 which is secured thereto and formed with gear teeth 8a on the arcuate peripheral edge. A pawl plate 9 is mounted at one end on the seat cushion bracket 2 by a pin 10 for swinging movement about the pin 10. As clearly shown in FIGS. 4 and 5, the pawl plate 9 has pawl teeth 9a formed along a side edge in the vicinity of the free end leaving a locking seat 30 axially outwardly of the pawl teeth 9a. The pawl plate 9 is arranged so that the pawl teeth 9a can be brought into engagement with the gear teeth 8a on the sector plate 8 when the pawl plate 9 is swung toward the sector plate 8. An actuating lever 12 is mounted at one end on the shaft 4. The lever 12 has a roller 14 which is engaged with the swinging member 9 at an edge opposite to the edge where the pawl teeth 9a are formed. The actuating lever 12 is formed with a cam sot 15 which is engaged with a pin 11 on the pawl plate 9. There is provided a tension spring 13 between the bracket 2 and the actuating lever 12 so that the lever 12 is biased counterclockwise as seen in the plane of FIG. 1.

The edge of the pawl plate 9 with which the roller 14 is engaged, and the cam slot 15 formed on the actuating lever 12 are shaped so that, when the actuating lever 12 is in the position shown in FIG. 1, the pawl plate 9 is forced by the roller 14 into a position wherein the pawl teeth 9a are engaged with the gear teeth 8a on the sector plate 8 but, when the lever 12 is pulled up to swing upward about the shaft 4, the pawl plate 9 is swung counterclockwise about the pin 10 under the cam action of the slot 15 to disengage the pawl teeth 9a from the gear teeth 8a on the sector plate 8. It will therefore be understood that the seat back plate 6 is made free to swing about the shaft 4 by pulling up the actuating lever 12 so that the seat back 5 can be tilted to a desired angle. When the actuating lever 12 is thereafter released, the pawl plate 9 is forced to swing toward the sector plate 8 so that the pawl teeth 9a become engaged with the gear teeth 8a on the sector plate 8 to hold the seat back 5 in the tilted position. Numeral 16 is a side plate.

Figure 2:
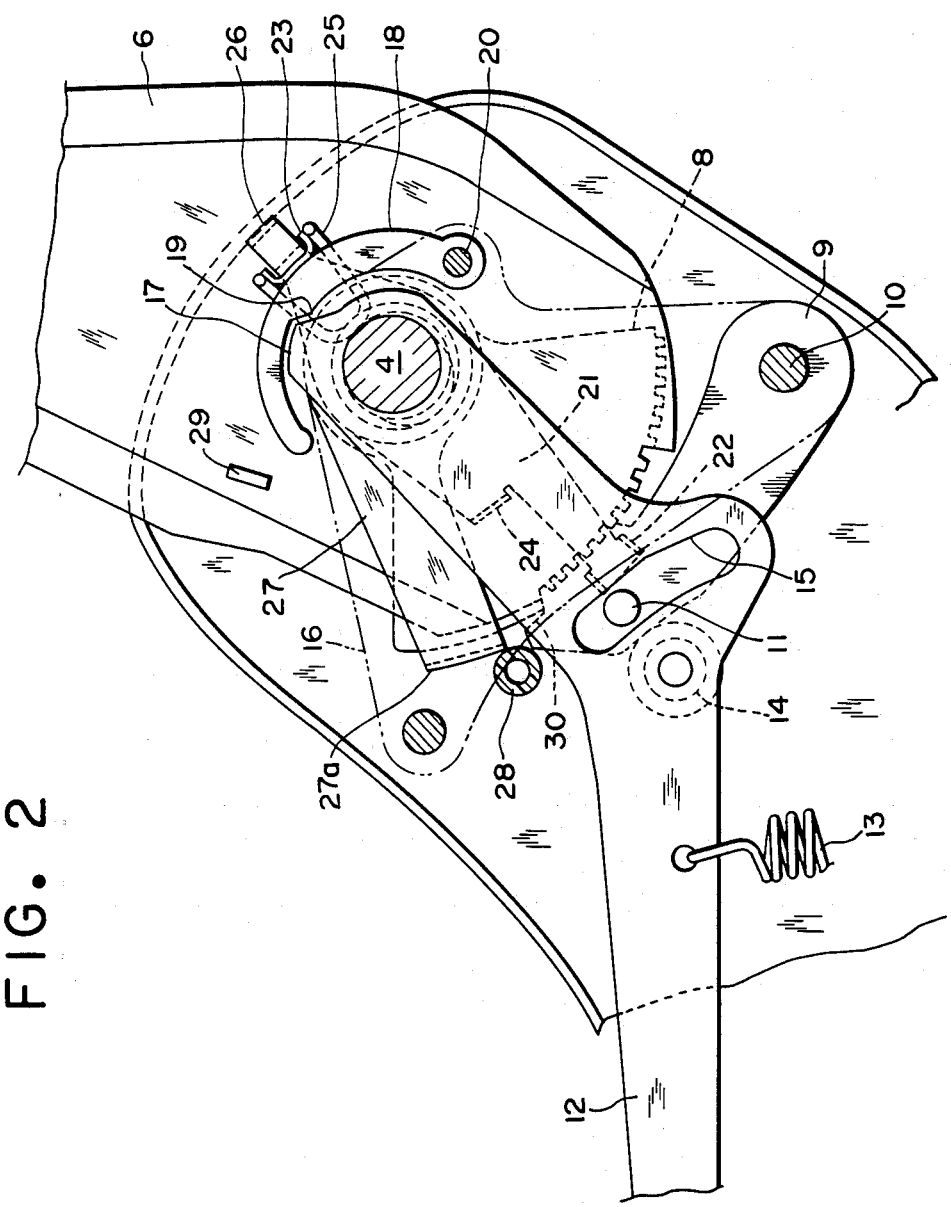
FIG. 2 is an enlarged view showing the details of the seat structre constructed according to one embodiment of the present invention.
Figure 3:
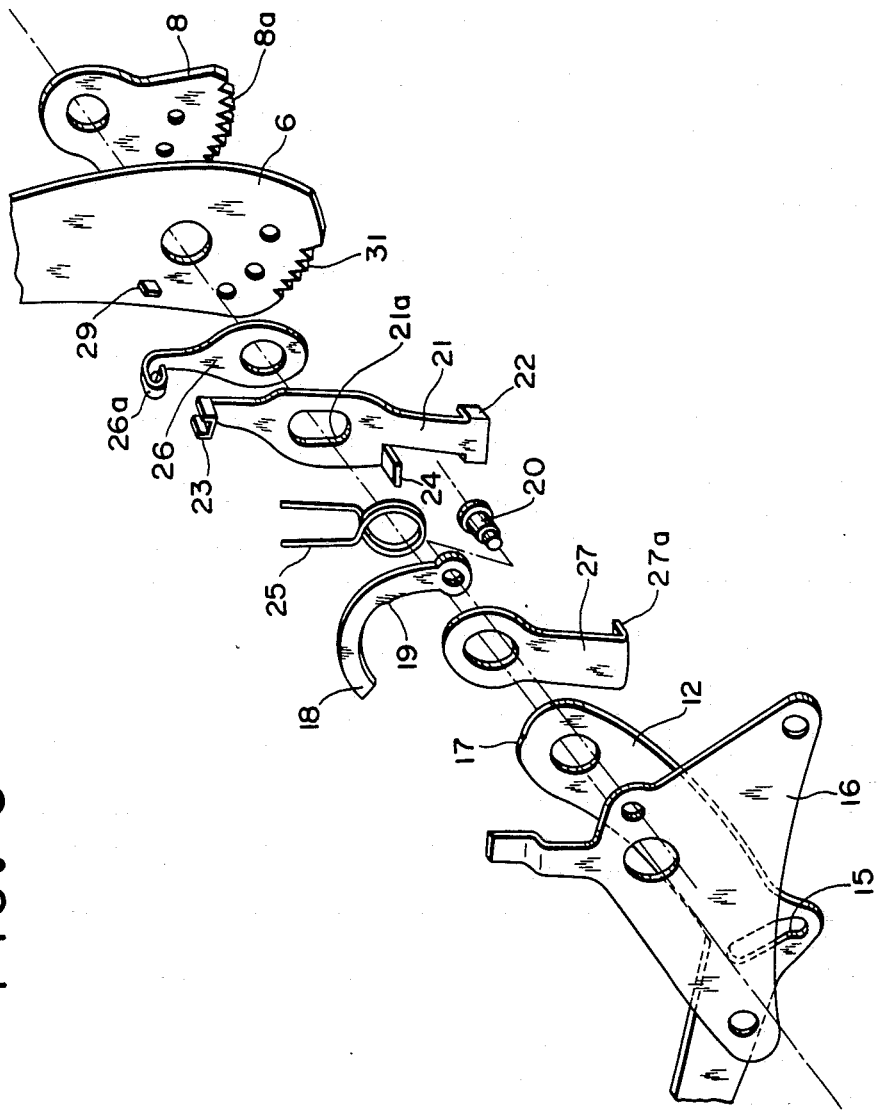
FIG. 3 is an exploded perspective view of the parts used in the tilt position memory device of the invention.

Referring now to FIGS. 2 and 3, it will be noted that the actuating lever 12 is formed at the pivoted end with a cam 17 projecting upward from the shaft 4. A cam lever 18 having a cam edge 19 is pivotably mounted at one end on the seat back plate 6 by means of a pin 20. A sliding member 21 having a longitudinally elongated slot 21a is mounted on the shaft 4 by having the slot 21a engaged with the shaft 4. Thus, the sliding member 21 is axially slidable with respect to the shaft 4.

As shown in FIG. 3, the seat back plate 6 is formed at the lower edge with gear teeth 31 and the slidable member 21 is formed at the lower end with pawl teeth 22 which are brought into engagement with the gear teeth on the seat back plate 6 when the member 21 is slidably moved axially upward. In order to force the slidable member axially downward, there is provided a leaf spring 26 having a curved resilient end 26a. The leaf spring 26 is rotatably mounted on the shaft 4 with the curved resilient end 26a overhanging the slidable member 21. The slidable member 21 is formed at the upper end with a spring seat 23 which is engaged with the resilient end 26a of the leaf spring 26. The spring seat 23 on the slidable member 21 is also engaged with the upper edge of the cam lever 18. It will therefore be understood that, when the actuating lever 12 is pulled up, the cam 17 on the end of the lever 12 is rotated clockwise engaging the cam profile 19 on the cam lever 18 causing a clockwise swinging movement of the cam lever 18 about the pivot pin 20. This will cause the slidable member 21 to be forced axially upward against the force of the leaf spring 26 through the engagement between the upper edge of the cam lever 18 and the spring seat to thereby bring the pawl teeth 22 into engagement with the gear teeth 31 on the seat back plate 6.

A torsion spring 25 is provided around the shaft 4 and has opposite ends engaged with the opposite sides of the spring seat 23 on the slidable member 21. The torsion spring 25 is deformed when the slidable member 21 is rotated about the shaft 4 in either direction by having one end forced in a corresponding direction while the coiled body of the spring 25 is held on the shaft 4 through the frictional force between the spring 25 and the shaft 4.

On the shaft 4, there is also provided a locking plate 27 which is mounted for swinging movement about the shaft 4. The locking plate 27 has an end 27a engageable with the locking seat 30 on the pawl plate 9. The seat cushion bracket 2 is provided with a friction member 28 which is adapted to be engaged with the end 27a of the locking plate 27 for frictionally holding the locking plate 27. The seat back plate 6 is provided with a pawl 29 which is adapted to be engaged with the locking plate 27 to drive the locking plate 27 into a locking position wherein the end 27a of the plate 27 is engageable with the locking seat 30 on the pawl member 9. The slidable member 21 is further formed with a pawl 24 which is adapted to be engaged with the locking plate 27 to drive the locking plate 27 out of engagement with the locking seat 30 on the pawl member 9 when the slidable member 21 is rotated clockwise about the shaft 4. The aforementioned mechanism is covered by a side plate 16.

In operation, when the seat back 5 is in the upright position and the actuating lever 12 is released, the pawl plate 9 is forced by the roller 14 on the actuating lever 12 toward the sector plate 8 so that the pawl teeth 9a on the pawl plate 9 are engaged with the gear teeth 8a on the sector plate 8. Thus, the seat back 5 is locked firmly in the upright position. When it is desired to have the seat back 5 inclined, the actuating lever 12 is pulled upward so that it is swung clockwise. The pawl plate 9 is then swung counterclockwise due to the engagement between the cam slot 15 in the actuating lever 12 and the pin 11 on the pawl plate 9 so that the pawl teeth 9a are disengaged from the gear teeth 8a to make the seat back 5 free to incline. Then, the seat back 5 is forced to a desired angle of inclination and the actuating lever 12 is released. Thus, the pawl teeth 9a on the pawl plate 9 are engaged again with the gear teeth 8a on the sector plate at positions different from those where the pawl teeth 9a were engaged with the gear teeth 8a in the upright position of the seat back 5.

Figure 4:
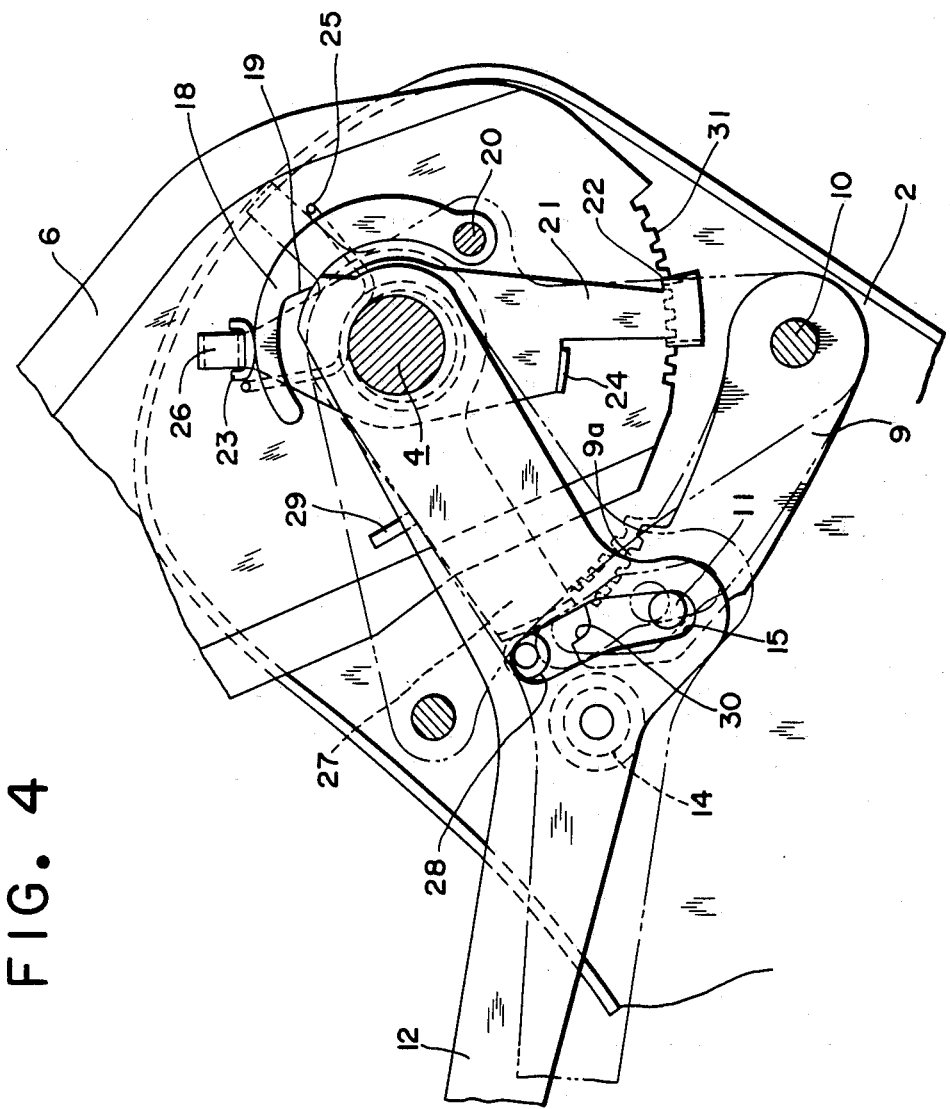
FIG. 4 is an enlarged side view showing the seat structure in the forwardly folded position; and, FIG. 5 is an enlarged side view showing the seat structure in a rearwardly inclined position.
Figure 5:
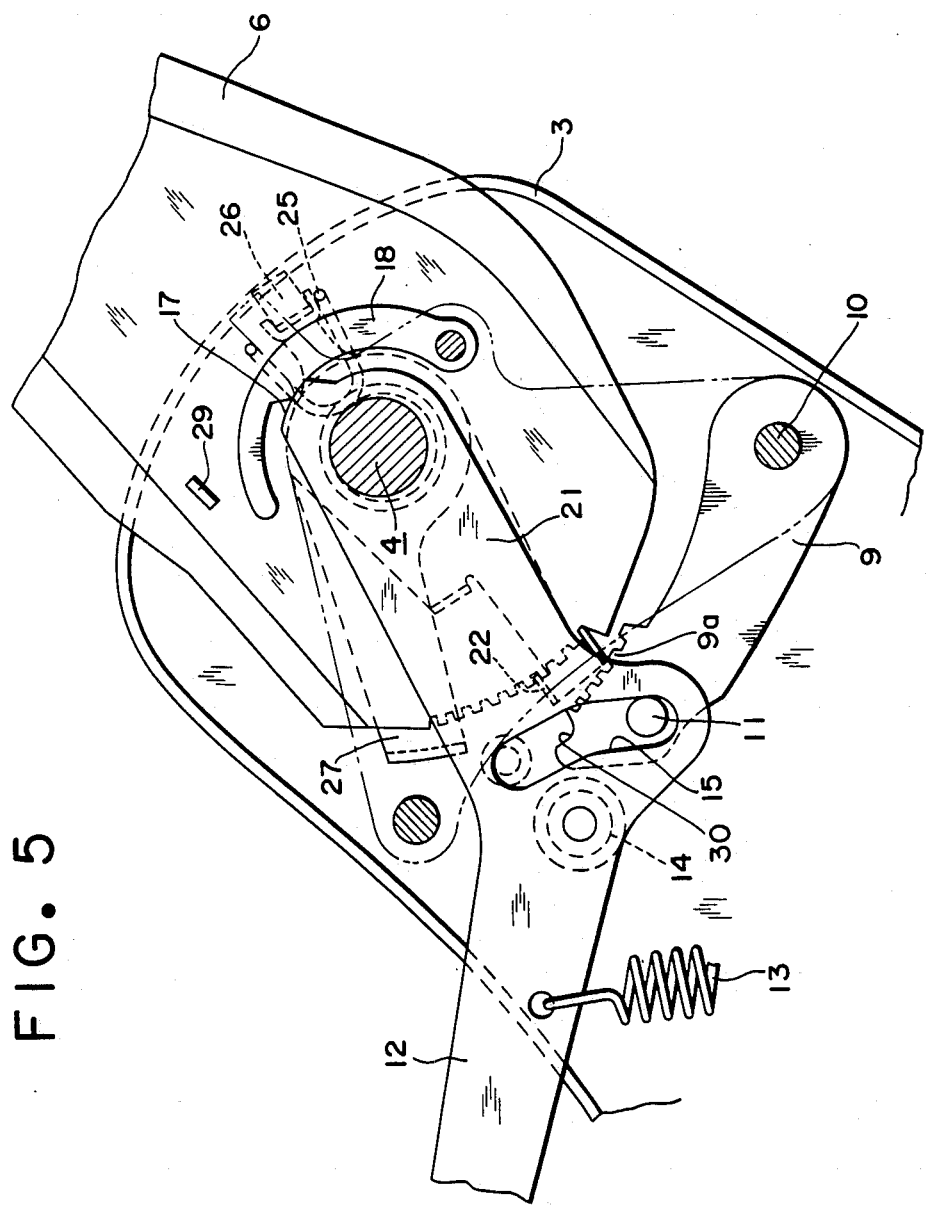

In the tilted position, when it is desired to have the seat back 5 folded forward, the actuating lever 12 is pulled upward to make the lever 12 swing clockwise so that the pawl teeth plate 9 is swung about the pin 10 to have the pawls 9a disengaged from the gear teeth 8a on the sector plate 8 due to the cam action applied by the cam slot 15 to the pin 11. Before the pawl teeth 9a are disengaged from the gear teeth 8a, the cam 17 on the lever 12 is engaged with the cam profile 19 on the lever 18 to cause the lever 18 to swing clockwise about the pin 20. The clockwise swinging movement of the lever 18 then causes the slidable lever 21 to move upward against the action of the spring 26 through the engagement between the lever 18 and the spring seat 23. As the result, a pawl teeth 22 on the slidable member 21 are engaged with the gear teeth 31 on the seat back plate 6 so as to memorize the inclination angle of the seat back 5. Thereafter, the pawl teeth 9a on the pawl plate 9 are disengaged from the gear teeth 8a on the sector plate 8 and the seat back 5 is folded forward as shown in FIG. 4.

In the course of the seat back 5 being folded forward the pawl 29 on the seat back plate 6 is engaged with a side edge of the locking plate 27 and causes the locking plate 27 to swing counterclockwise to a position where the end 27a of the plate 27 opposes the locking seat 30 on the pawl plate 9. The forward folding movement of the seat back plate 6 causes the cam lever 18 to move around the shaft 4 in the counterclockwise direction so that the cam profile 19 on the lever 18 is maintained in engagement with the cam 17 on the actuating lever 12. It will therefore be understood that the pawl teeth 22 on the slidable member 21 are maintained in engagement with the gear teeth 31 on the seat back plate 6 when the seat back 5 is being folded forward to memorize the inclination angle of the seat back 5.

When the seat back 5 is moved from the forwardly folded position, toward an erect position the locking plate 27 is held in position frictionally due to the friction between the plate 27 and the friction member 28. It will therefore be understood that the end 27a on the locking plate 27 engages the locking seat 30 on the pawl plate 9 to prevent the pawl plate 9 from swinging toward the sector plate 8. Thus, the seat back 5 can be move rearward beyond the upright position toward the memorized inclined position. It should be noted that the actuating lever 12 is locked in this instance to the pawl plate 9 due to the engagement between the cam slot 15 and the pin 11 so that the lever 12 is maintained at a pulled-up position against the action of the spring 13 as the seat back 5 is being erected.

When the seat back 5 is moved to the memorized inclination angle, the pawl 24 on the slidable member 21 engages the locking plate 27 to kick the locking plate 27 clockwise to free the end 27a of the locking plate 27 from the locking seat 30 on the pawl plate 9. Thus, the pawl plate 9 becomes free to swing and the actuating lever 12 is now allowed to return to the released position. The pawl plate 9 is therefore swung clockwise under the cam action of the cam slot 15 to thereby have the pawl teeth 9a engaged with the gear teeth 8a on the sector plate 8. It will therefore be understood that the seat back 5 is now locked at the inclined position as memorized by the slidable member 21. At the same time, the actuating lever 12 is returned to the released position so that the cam 17 is disengaged from the cam profile 19 on the cam lever 18 and the slidable member 21 is moved downward under the action of the spring 26 to have the pawl teeth 22 disengaged from the gear teeth 31.

It should be noted that the slidable member 21 is rotated together with the seat back plate 6 when the inclination angle of the seat back 5 is being adjusted. This is because that, whenever the actuating lever 12 is pulled up, the sliding member 21 is axially moved upward so that the pawl teeth 22 are engaged with the gear teeth 31. This engagement is maintained until the actuating lever 12 is released. As soon as the actuating lever 12 is released, the slidable member 21 is moved axially downward disengaging the pawl teet 22 from the gear teeth 31. Then, the slidable member 21 is rotated under the action of the torsion spring 25 to the neutral position so that the pawl teeth 22 are moved to positions where they are engageable with portions of the gear teeth corresponding to the inclination angle of the seat back 5. It will therefore be understood that, when the actuating lever 12 is pulled up, the slidable member 21 is maintained at a position corresponding to the inclination angle of the seat back 5 to memorize the inclination angle.

The invention has thus been shown and described with reference to a specific embodiment, however, it should be noted that the invention is in no way limited to the details of the illustrated structures but changes and modifications may be made without departing from the scope of the appended claims.

We claim:

1. A tilting mechanism including a stationary member, a movable member mounted on said stationary member for swinging movement about a first axis on said stationary member, a first series of teeth provided on said movable member, a second series of teeth provided on said movable member and arranged in parallel with said first series of teeth, a swingable member mounted on said stationary member for swinging movement about a second axis on said stationary member and having at least one pawl which is adapted to be engaged in the first series of teeth on the movable member, an actuating lever mounted on said stationary member for rotational movement about said first axis, said actuating lever having means for moving upon rotational movements of the lever said swinging member into and out of an engaged position wherein said pawl is engaged with said first series of teeth on said movable member, a slidable member supported by said stationary having at least one pawl normally disengaged from said second series of teeth on said movable member, resilient means for yieldably forcing said slidable member to a position where said pawl on the slidable member is disengaged from the second series of teeth, memory means responsive to movement of the actuating lever for moving the slidable member against said resilient means so that the pawl on the slidable member becomes engaged with the second series of teeth when the actuating lever forces the swingable member out of said engaged position, a locking member mounted on said stationary member for swinging movement about said first axis, said locking member movable between a first position where it is engaged with said swinging member to hold the swinging member out of said engaged position and a second position where it is disengaged from said swinging member, said slidable member engageable with said locking member to force the locking member into said second position when said movable member is returned to an original tilted position after it has been moved from the original tilted position to another position so as to disengage the locking member from the swinging member to make the swinging member free to have its pawl engage the first series of teeth, and means for normally maintaining the slidable member in a position wherein said pawl on the slidable member is engageable with a portion of the second series of teeth corresponding to an actual tilted position of the movable member.

2. A tilting mechanism in accordance with claim 1 in which said memory means includes cam means provided between said actuating lever and said slidable member.

3. A tilting mechanism in accordance with claim 1 further comprising means for moving the locking member into said first position when the movable member is moved to said another position.

4. A tilting mechanism in accordance with claim 3 in which said moving means is a pawl positioned on said movable member and engageable with said locking member to move the same to the first position.

5. A tilting mechanism in accordance with claim 1 in which said slidable member has means for engaging the locking member when the movable member is returned to the original tilted position to move the locking member to the second position.

* * * * *